United States Patent
Sollee et al.

(10) Patent No.: US 6,614,899 B1
(45) Date of Patent: Sep. 2, 2003

(54) METHOD AND APPARATUS FOR PROVIDING ADVANCED IP TELEPHONY SERVICES IN AN INTELLIGENT ENDPOINT

(75) Inventors: Patrick Sollee, Richardson, TX (US); Christopher Jessen, McKinney, TX (US); Robert Barretto, Garland, TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/494,721

(22) Filed: Jan. 31, 2000

(51) Int. Cl.⁷ .................................. H04M 3/42
(52) U.S. Cl. ................... 379/218.01; 370/395
(58) Field of Search ............ 379/201.01, 201.05, 379/218.01; 370/395

(56) References Cited

U.S. PATENT DOCUMENTS 6,243,815 B1 * 6/2001 Antur et al. ................ 713/201
6,470,357 B1 * 10/2002 Garcia, Jr. et al. .......... 707/200

OTHER PUBLICATIONS

Handley, et al.; SIP: Session Initiation Protocol; Mar. 1999; pp. 1–134.

* cited by examiner

Primary Examiner—Creighton Smith

(57) ABSTRACT

A method and apparatus in a communications system for providing advanced Internet Protocol (IP) telephony services in an intelligent endpoint. The apparatus and method of the present invention provides a user with the capability to update a local directory from a directory server, perform click to call functions, and perform intelligent processing of incoming calls.

23 Claims, 10 Drawing Sheets

FIG. 5

Directory Entry Sync

| Current Raider Entry | Web Entry (To Be Sync'ed) |
|---|---|
| Last Name: Jessen | Last Name: Jessen |
| First Name: Chris | First Name: Chris |
| User ID: cjessen | User ID: NOT INCLUDED |
| Home Address: 107 Ledgenest Dr, McKinney TX 75070 | Home Address: 9621 Arden Drive, Rockwall Tex as 75087 |
| SubscriberNumber: 9726857714 | SubscriberNumber: 9726857714 |
| Home Phone Number: 9724753335 | Home Phone Number: 9724753335 |
| Office Phone Number: 9726840635 | Office Phone Number: 9726940635 |
| Mobile Phone Number: 9991112222 | Mobile Phone Number: 9728967146 |
| Pager Number: 9991113333 | Pager Number: 9991112222 |
| Fax Number: 9991114444 | Fax Number: 9991113333 |
| E-Mail Address: cjessen@nortelnetworks.com | E-Mail Address: cjessen@airmail.com |
| IP Address: 47.41.130.11 | IP Address: 47.161.80.173 |
| SIP Address: cjessen@47.42.130.11.us.nn.c | SIP Address: cjessen@47.161.80.173 |

Keep Current Raider Directory Entry/Ignore Web Ent... — 510

Keep Raider Directory Entry/Add Web Entry As New Raider E... — 530

Overwrite Current Raider Entry With Web Entry — 520

500

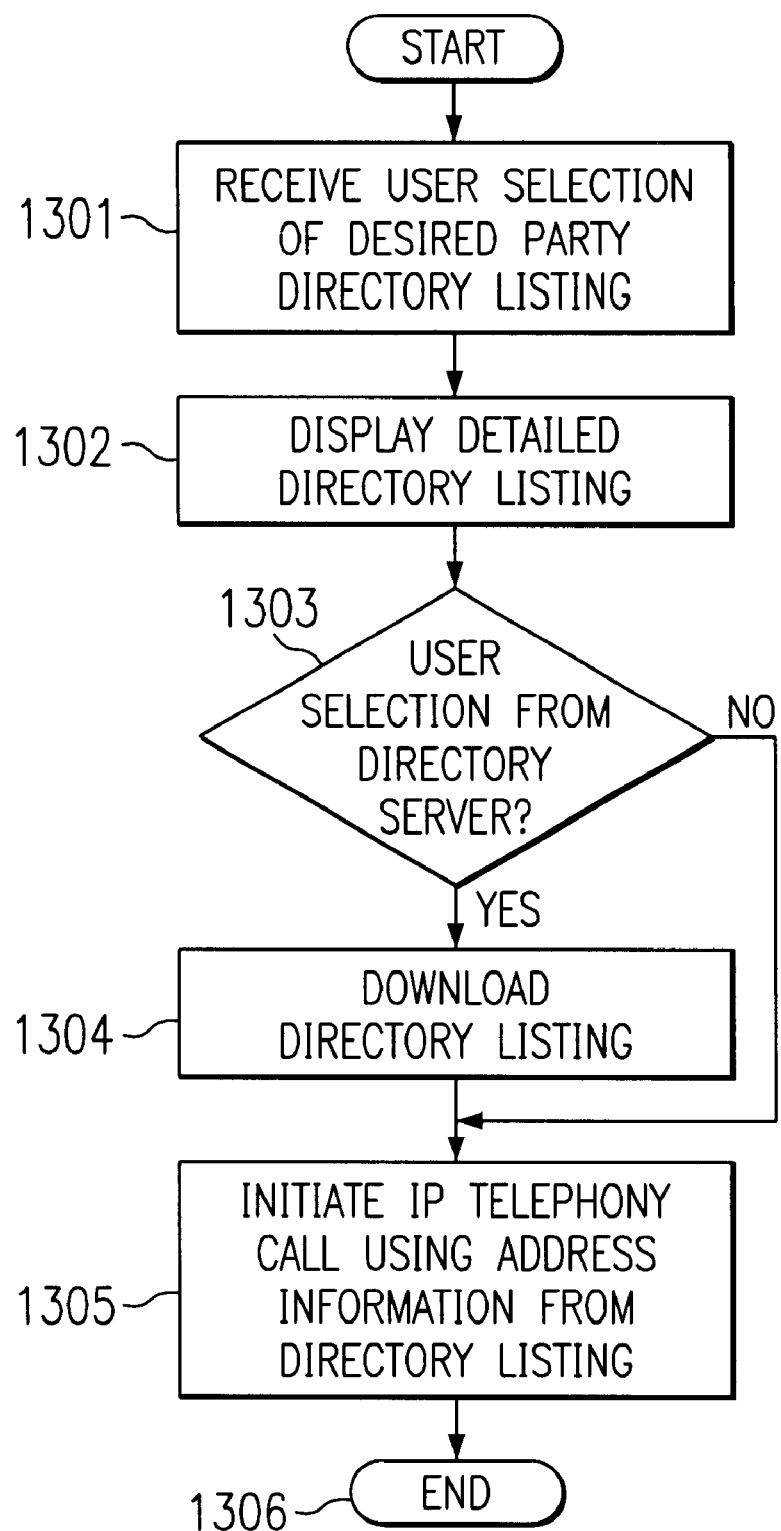

METHOD AND APPARATUS FOR PROVIDING ADVANCED IP TELEPHONY SERVICES IN AN INTELLIGENT ENDPOINT

FIELD OF THE INVENTION

The present invention relates generally to methods and apparatus for providing advanced IP telephony services in an intelligent endpoint. Specifically, the present invention is directed to an IP telephony intelligent endpoint that is capable of updating local IP telephony directories from an IP network server, performing click-to-dial services using the local IP telephony directories, and performing advanced IP telephony services on incoming IP telephony communications.

BACKGROUND OF THE INVENTION

Internet Protocol (IP) telephony is generally known in the art. In IP telephony, a user may make telephone calls over an IP network, such as the Internet. One of the main advantages of using IP telephony is that all IP telephone calls are considered local area telephone calls. This is because the user typically makes a local telephone call to an IP server in order to gain access to the IP network and from there on, the telephone call is merely comprised of IP data packets over the IP network. Thus, long distance charges for long distance telephone calls are not incurred when the long distance telephone call is an IP telephony call.

Typically, the user must have an IP configured telephone or must dial into an IP telephony server in order to initiate the IP telephony communication. The known IP configured telephones are "non-intelligent" telephones, meaning that they rely on the IP network to provide advanced services, such as call forwarding.

Because network evolution is a slow process, a large amount of time may pass before new advanced services are made available to IP telephony users. Furthermore, IP network based advanced services are very inflexible and do not allow individual users to customize their IP telephony service. Thus, it would be beneficial to have an intelligent IP network endpoint device that is easily upgradable and provides the ability to customized IP telephony service.

SUMMARY OF THE INVENTION

The present invention provides methods and apparatus for providing advanced IP telephony services using an intelligent endpoint device. The apparatus includes a directory update device, a click to call device and an incoming call processor.

The apparatus is capable of performing updates to a local directory by retrieving directory information from a directory server using an Internet connection. The Internet connection makes use of a web browser application and a directory server applet to perform the download of updated directory information. In this way, firewalls and other security precautions are circumvented so that the directory information may be downloaded.

The apparatus further compares the directory update information against local directory information to determine if corresponding directory listings are present. If so, the apparatus provides the user with the option to accept the update directory information from the directory server, keep the local directory information, select portions of the update directory information and the local directory information for creating a new combined directory listing, or to add a new directory listing using the update directory information.

The apparatus may further use either directory information from the directory server or local directory information to initiate IP telephony calls using a click to call interface. The user need only select a desired party's directory listing and click a virtual button corresponding to a call function. If the directory listing is on the directory server, the directory listing selection may be made using a browser application that initiates an applet to download corresponding directory information to the apparatus and to instruct the apparatus to initiate an IP telephony communication connection. Otherwise, the local directory listing is utilized.

The apparatus further performs intelligent processing of incoming IP telephony calls. Based on an identification of the calling party, the apparatus is able to screen calls and perform customized intelligent processing on the incoming IP telephony calls. The customized intelligent processing may include ignoring the call, redirecting the call to another address, redirecting the call to a web page or electronic mail address, playing a greeting, and/or executing an application. The particular intelligent processing may be customized based on time of day, day of week, date range, and the like.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein like numerals designate like elements, and wherein:

FIG. 5 is an exemplary diagram of a graphical user interface for comparing a local directory listing and a directory server listing according to the present invention;

FIG. 13 is a flowchart outlining an exemplary operation of the click to call device of FIG. 3.

DETAILED DESCRIPTION OF THE PREFERRED EMBODIMENT

Figure 1:
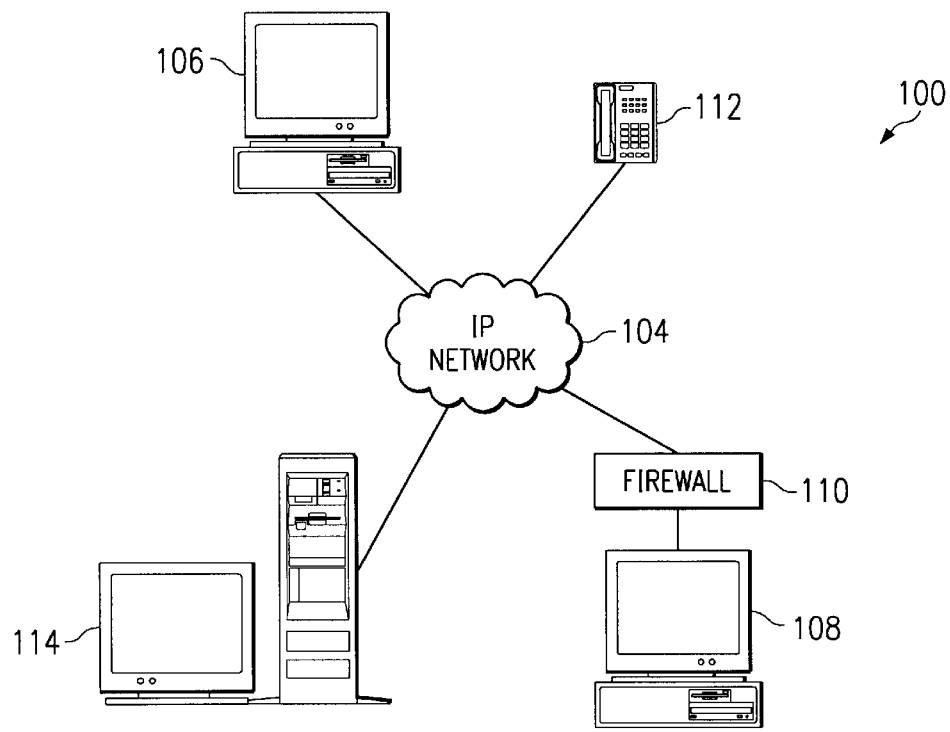
FIG. 1 is an exemplary block diagram of a communication system in which the present invention may be implemented.

FIG. 1 is an exemplary block diagram of a communication system in which the present invention may be implemented. Communications system 100 is a network of computers in which the present invention may be implemented. Communications system 100 includes an IP network 104, such as the Internet. Additionally, communications system 100 also includes computing devices 106, 108, IP telephony apparatus 112, and directory server 114. The computing device 108 is located behind a firewall 110, with respect to the IP network 104. While FIG. 1 shows firewall 110 as a separate element for purposes of clarification, as is known to those of ordinary skill in the art, the firewall 110 may be resident on a server to which the computing device 108 is connected or on the computing device 108 itself.

The IP network 104 in this example is the Internet, i.e. a worldwide collection of networks and gateways that use the TCP/IP suites of protocols to communicate with one another. At the heart of the Internet is a backbone of high-speed data communication lines between major nodes or host computers, consisting of thousands of commercial, government, educational, and other computer systems that route data and messages.

Computing devices 106 and 108 may be any type of computing device or data processing system that is capable of telephony communication. The computing devices 106 and 108 may have IP telephony communication devices incorporated into them or may have separate IP telephony devices connected to them via appropriate communication links. The computing devices 106 and 108 may include, for example, a microphone and speaker arrangement for receiving voice input and providing audio output or may communicate with an IP telephony device via, for example, cables and device interfaces to receive voice input and provide audio output. The computing devices 106 and 108 receive voice input, convert the voice input into IP data packets, and send the IP data packets over the IP network 104 to a desired target device. Similarly, the computing devices 106 and 108 receive IP telephony data packets, convert the IP telephony data packets into digital signals and output the digital signals as audio output via associated speakers.

While the description of the present invention references the use of IP telephony, the invention is not limited to the IP protocol. Rather, any communication protocol that may be used to conduct telephony communication may be used without departing from the spirit and scope of the present invention.

IP telephony apparatus 112 is any type of IP telephony apparatus that is a dedicated IP telephony apparatus. IP telephony apparatus 112 may be, for example, an IP telephone which is dedicated to providing IP telephony communication over the IP network 104. The IP telephony apparatus 112 receives voice input, converts the voice input into IP data packets, and transmits the IP data packets over the IP network 104 to a target device. Similarly, the IP telephony apparatus 112 receives IP telephony data packets over the IP network 104, converts them into digital signals which are then output as audio output via a speaker or handset associated with the IP telephony apparatus 112.

The directory server 114 stores directory information for computing devices 106, 108, IP telephony apparatus 112, and other IP telephony capable devices (not shown) which are connected to the IP network 104. The directory server 114 may store such information as electronic mail addresses, IP addresses, session initiation protocol (SIP) addresses, as well as other contact information such as users' names, IP network identifications, home addresses, home telephone number, office telephone number, mobile telephone number, pager number, facsimile number, and the like. While FIG. 1 shows directory server 114 as a single server, the directory server 114 may be a cluster of servers.

In accordance with the present invention, computing device 106, for example, may include an intelligent IP telephony device. The intelligent IP telephony device is capable of updating local directory information from the directory server 114, initiating IP telephony communications using "click to call" and information from either the directory server or a local directory, and/or performing advanced call processing without relying on a network server to perform these functions.

Figure 2:
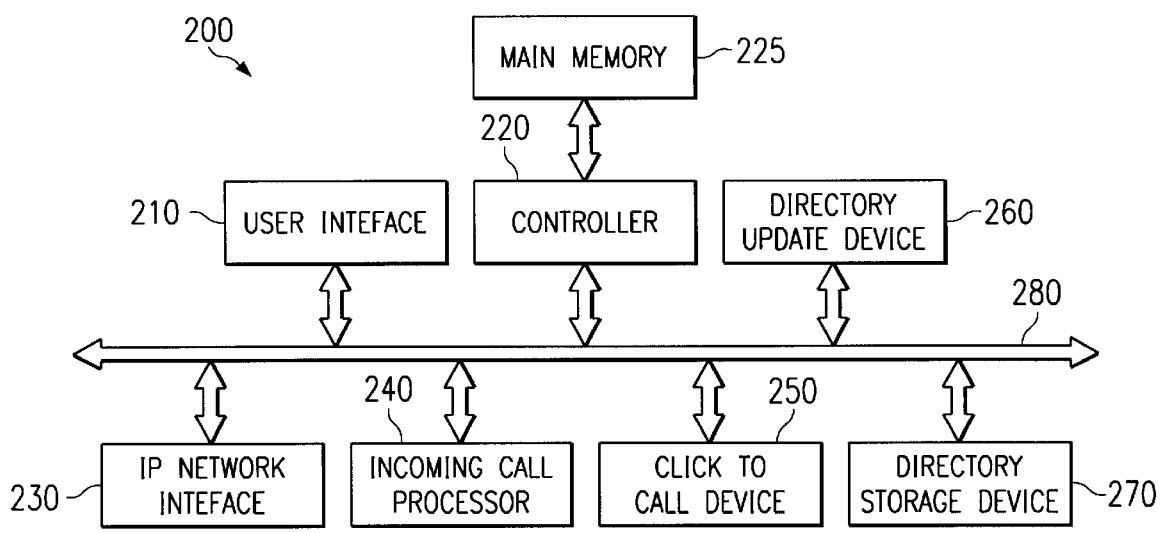
FIG. 2 is an exemplary block diagram of the intelligent IP telephony device.

FIG. 2 is an exemplary block diagram of an intelligent IP telephony device 200 according to the present invention. As shown in FIG. 2, the intelligent IP telephony device 200 includes a user interface 210, a controller 220, a main memory 225, an IP network interface 230, an incoming call processor 240, a click to call device 250, a directory update device 260, and a directory storage device 270. These elements are in communication with one another via the control/signal bus 280. Although a bus architecture is shown in FIG. 2, the invention is not limited to such an embodiment. Other architectures that provide a mechanism for communication among the elements 210–270 may be used without departing from the spirit and scope of the invention.

The controller 220 controls the operation of the intelligent IP telephony device 200. The controller 220 makes use of control programs and instructions stored in main memory 225. The controller 220 initiates each of the incoming call processor 240, the click to call device 250 and the directory update device 260 based on user input via the user interface 210 and information received via the IP network interface 230.

The user interface 210 may be any one or combination of input devices that may received input from a user and/or provide output to a user of the intelligent IP telephony device 200. For example, the user interface 210 may include a keyboard, pointing device, microphone, speaker, display device, and the like.

The IP network interface 230 is a mechanism by which the intelligent IP telephony device 200 sends and receives information over the IP network 104. The IP network interface 230 may make use of a modem, cable, or other type IP network 104 connection for the transmission of information to and from the intelligent IP telephony device 200. The IP network interface 230 may further make use of an IP network browser application, such as Netscape™ or Microsoft Internet Explorer™, to log onto an IP network 104 server in order to gain access to the IP network 104.

The directory update device 260 performs functions necessary for updating a local directory, stored in directory storage device 270, using information received from one or more directory servers 114 on the IP network 104. The directory update device 260 sends a request to a directory server 114 for an update of directory information via the IP network interface 230. When the updated information is received, the directory update device compares the updated information with information stored in the local directory and interacts with a user via the user interface 210 to determine which information to retain in the local directory stored in directory storage device 270, as will be discussed more fully hereafter.

The click to call device 250 performs functions for establishing a communication connection between the intelligent IP telephony device 200 and a desired target device based on directory information retrieved from either the local directory in directory storage device 270 or from the directory server 114. The click to call device 250 allows a user to select directory information being displayed on the user interface 210 using a pointing device or other input device, and have a call initiated to a device associated with the displayed directory information, as will also be discussed in more detail hereafter.

The incoming call processor 240 performs a variety of intelligent processing functions on incoming IP telephony calls received via the IP network interface 230. Based on different factors, such as time of day, day of the week, calendar dates, calling party identification, and the like, the incoming call processor 240 may perform any of a number of functions. These functions include ignoring the incoming call, playing a greeting, forwarding the call to another IP telephony number, redirecting the calling party to an IP network web page or initiating an electronic mail program on the calling party's IP telephony device, initiating an application, and the like. Descriptions of these various functions will be provided in more detail hereafter.

Thus, with the intelligent IP telephony device 200 of the present invention, a local directory may be updated from an IP network directory server, a click to call functionality is provided, and intelligent processing of incoming calls is provided. Accordingly, the intelligent IP telephony device 200 may be upgraded and customized easily by the user of the intelligent IP telephony device 200.

Figure 3:
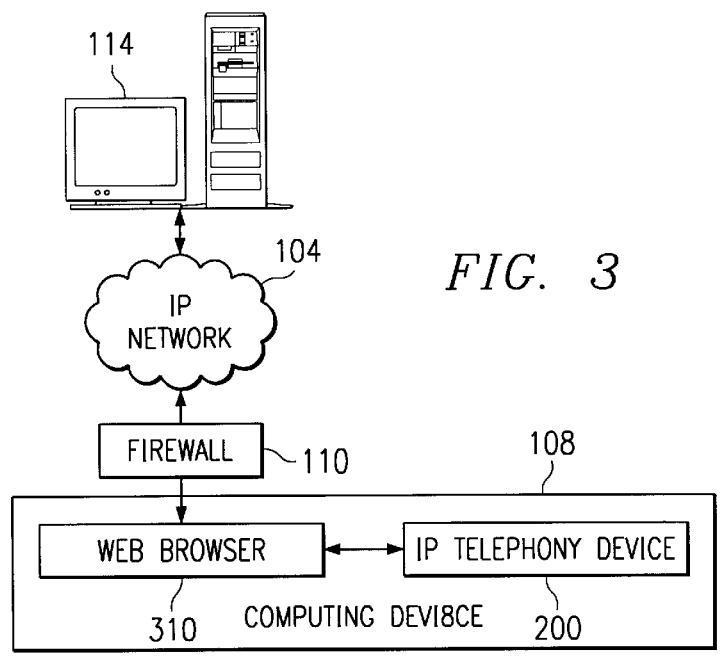
FIG. 3 is an exemplary block diagram illustrating the mechanism by which a local directory is updated from a directory server.

FIG. 3 is an exemplary block diagram illustrating the manner by which the intelligent IP telephony device 200 may be used to update a local directory stored in directory storage device 270. As shown in FIG. 3, rather than establishing a communication connection directly between the directory server 114 and the intelligent IP telephony device 200, communication is funneled through a web browser application 310 that is running locally on the computing device 108 with which the intelligent IP telephony device 200 is associated. The user of the intelligent IP telephony device 200 logs onto the directory server using the web browser application 310. When the directory server 114 needs to communicate with the intelligent IP telephony device 200, an applet is executed on the web browser application 310. An applet is a small application program having limited utility.

The applet communicates with the directory server using hyper text transfer protocol (HTTP) and communicates with the intelligent IP telephony device 200 directly because they are both resident on the same computing device 108. This allows the intelligent IP telephony device 200 to communicate with the directory server 114 even when there is a firewall 110 present.

A firewall is a method used to keep a network secure. It can be implemented in a single router that filters out unwanted packets, or it may use a combination of technologies in routers and hosts. Firewalls are widely used to give users access to the Internet in a secure fashion as well as to separate a company's public Web server from its internal network. Firewalls are also used to keep internal network segments secure.

The firewall 110 blocks direct access from the intelligent IP telephony device 200 to the directory server 114. However, the firewall 110 allows HTTP traffic to pass between the IP network 104 and the web browser application 310. Thus, by funneling the communication to the directory server 114 through the web browser application 310, using HTTP, the intelligent IP telephony device 200 may circumvent the firewall 110 and perform directory updates from the directory server 114.

With reference again to FIG. 2, the user of the intelligent IP telephony device 200 initiates a local directory update by entering an update command via the user interface 210. In response, the directory update device 260 sends a request to the directory server 114 via the IP network interface 230. This process may make use of the web browser application 310 which may already be running on the computing device 108 or may be automatically initiated by the directory update device 260 when the user's update command is received. The process of updating the local directory using the directory server 114 is also referred to as "synchronizing" the local directory with the directory server 114.

The request from the directory update device 260 initiates a download of directory information from the directory server 114. The particular directory information downloaded may be based on an identification of the user that requested the directory update, parameters entered by the user, or user associated information. For example, the downloaded information may be limited to those directory listings that have been changed from a last update session identified, for example, by a date and time of the last download from the directory server 114.

These download criteria may be included in the request from the directory update device 260 when initiating the download of directory information from the directory server 114. The downloaded directory information may be temporarily stored as data files in a temporary storage (not shown) or may be stored as data files on the directory storage device 270 in a more permanent manner.

Either during the download of the directory information from the directory server 114 or after download from the directory server 114, the directory update device 260 determines which, if any, of the downloaded directory listings has a corresponding listing in the local directory stored in the directory storage device 270. This may be done, for example, using a simple filename comparison. Alternatively, a more complex comparison taking into account actual data values within the files may be utilized. With the later approach, local directory files and downloaded directory files which are an exact match may be disregarded. Corresponding listings that are not exact matches may then be displayed to the user via the user interface 210.

The user may then choose to either accept the downloaded directory listing, keep the local directory listing, keep both listings as separate listings in the local directory, or select various information from both to compile a new directory listing. If the user chooses to accept the downloaded directory listing, the corresponding local directory listing is overwritten in the directory storage device 270. If the user chooses to keep the local directory listing, the downloaded directory listing is deleted. If the user chooses to keep both listings, a new file is created with the downloaded directory listing.

If the user chooses to create a new listing with information from both directory listings, directory listing information in the local directory listing is overwritten by the selected information from the downloaded listing. Thus, information from the downloaded listing that is not selected does not overwrite the local directory listing information. In this way a combination of both listings is created.

The above process is repeated for each instance of corresponding directory listings. When no more corresponding directory listings are found, the directory update process is completed. When the directory update process in completed, results information may be provided to the user via the user interface 210.

Figure 4:
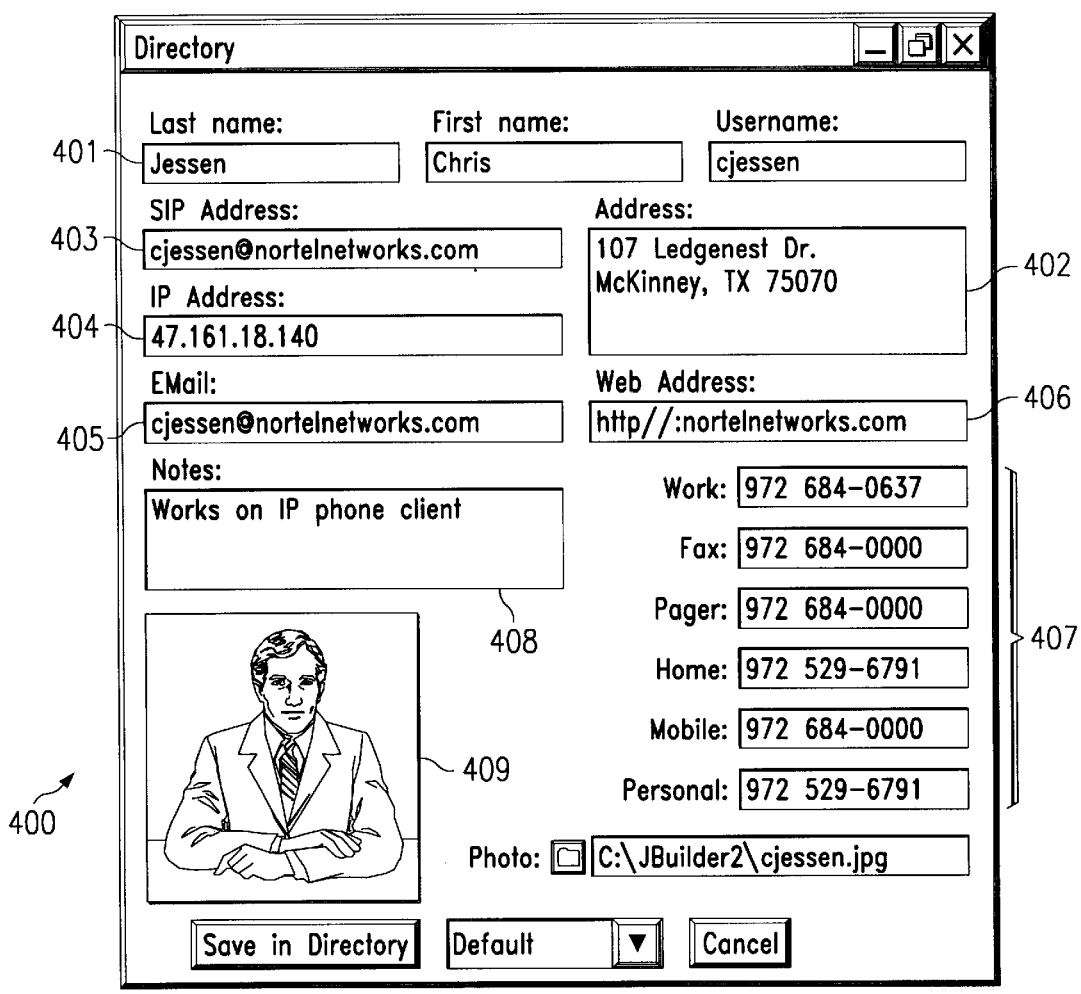
FIG. 4 is an exemplary diagram of a directory listing graphical user interface according to the present invention.

FIG. 4 is an exemplary diagram of a directory listing for either the directory server 114 or the local directory on the directory storage device 270. The graphical user interface 400 shown in FIG. 4 may be displayed to the user via the user interface 210 when the user selects the directory listing for placement of an IP telephony call, as will be described hereafter.

As shown in FIG. 4, the directory listing graphical user interface 400 includes fields for various personal contact information regarding the person described by the directory listing. The personal contact information includes, for example, the person's name (field 401), address (field 402), SIP address (used for initiating SIP communications, i.e. IP telephony calls)(field 403), IP address (field 404), electronic mail address (field 405), web page address (field 406), and various telephone, pager and facsimile numbers (fields 407). In addition, the directory listing provides fields 408 and 409 for including personal notes and for inclusion of a photograph of the person described by the directory listing.

FIG. 5 is an exemplary diagram of a graphical user 500 interface that is displayed via the user interface 210 when displaying corresponding local directory listings and directory server 114 listings. As shown in FIG. 5, the same directory information that is present in FIG. 4 is displayed in the graphical user interface 500 shown in FIG. 5. In addition, the graphical user interface 500 includes virtual buttons 510–530 for performing the functions of keeping the local directory listing, overwriting the local directory listing with the downloaded listing, or keeping both listings. Although not explicitly shown in FIG. 5, the graphical user display may also provide the function of selecting various information from both listings for creation of a new directory listing.

Figure 6:
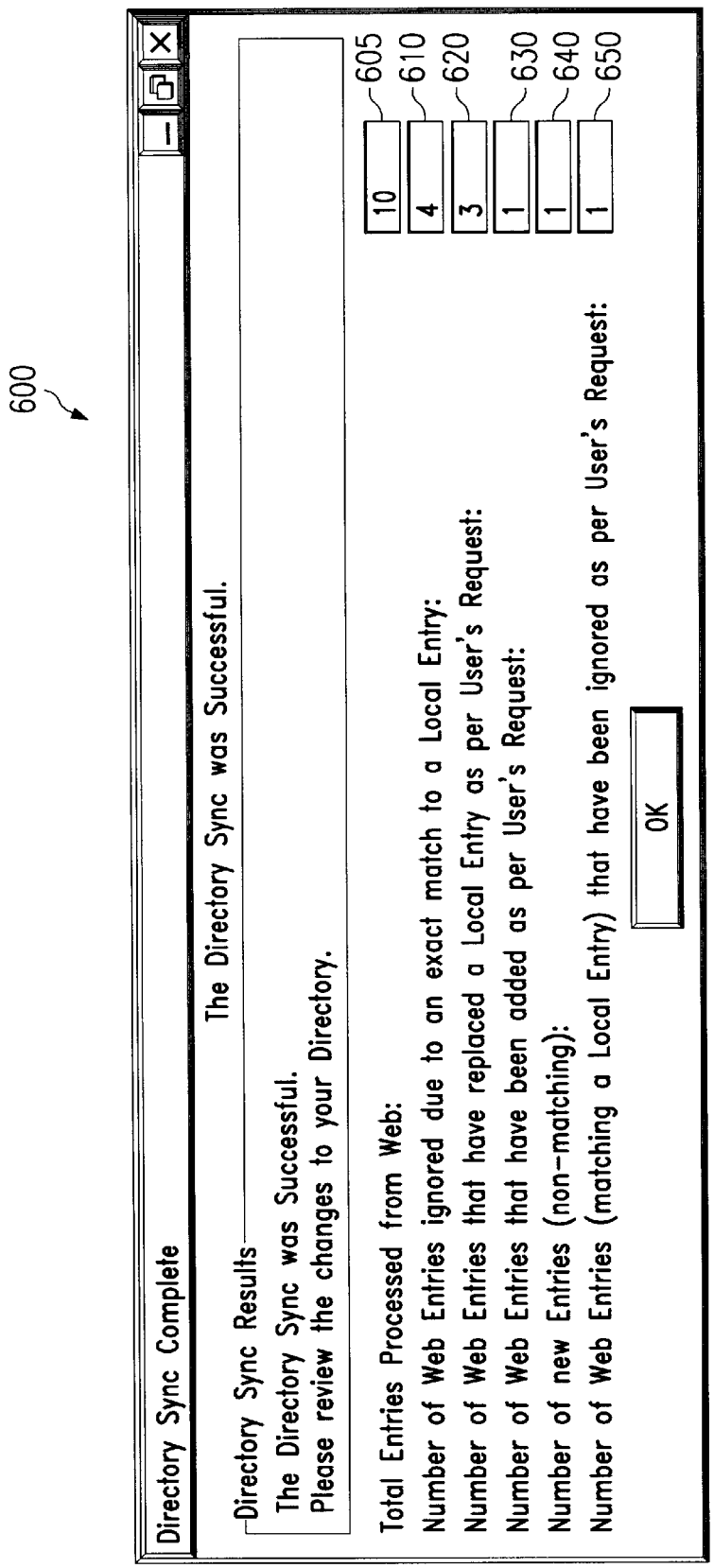
FIG. 6 is an exemplary diagram of a graphical user interface for displaying update results.

FIG. 6 is an exemplary diagram of a graphical user interface 600 representing the directory update results. As shown in FIG. 6, the graphical user interface 600 provides information related to the number of entries processed from the directory server 114 (field 605), the number of directory server listings ignored because they were identical to local directory listings (field 610), the number of directory server listings that were used to replace local directory listings (field 620), the number of new local directory listings created (field 630), the number of new local directory listings that were created and did not have a preexisting matching local directory listing (field 640), and the number of directory server listings that were ignored at the user's request (field 650).

In addition to updating the local directory in the directory storage device 270, the intelligent IP telephony device 200 may make use of either the local directory or the directory server 114 listings to initiate an IP telephony call to a desired party. This functionality is provided by the click to call device 250.

Figure 7A:
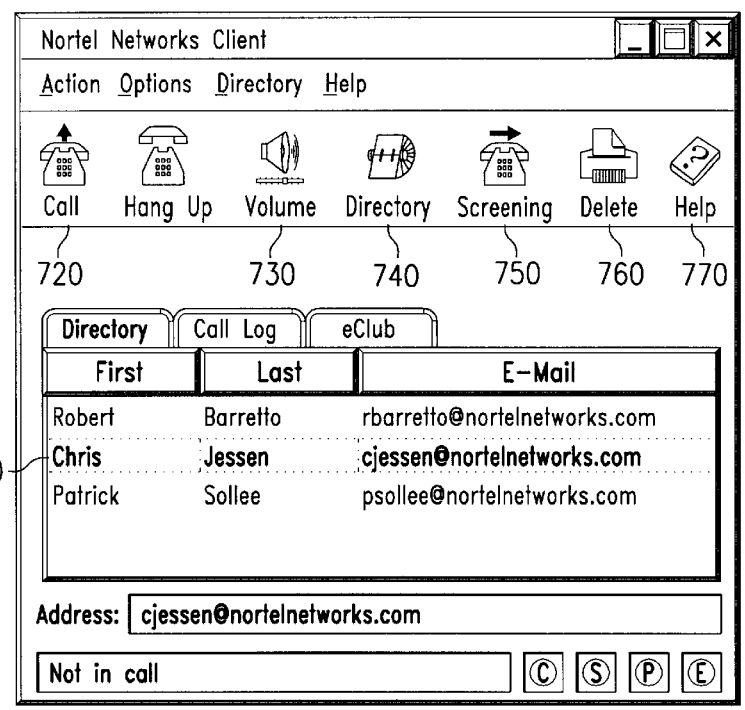
FIG. 7A is an exemplary diagram of a graphical user interface for performing click to call functions based on information from a local directory.
Figure 7B:
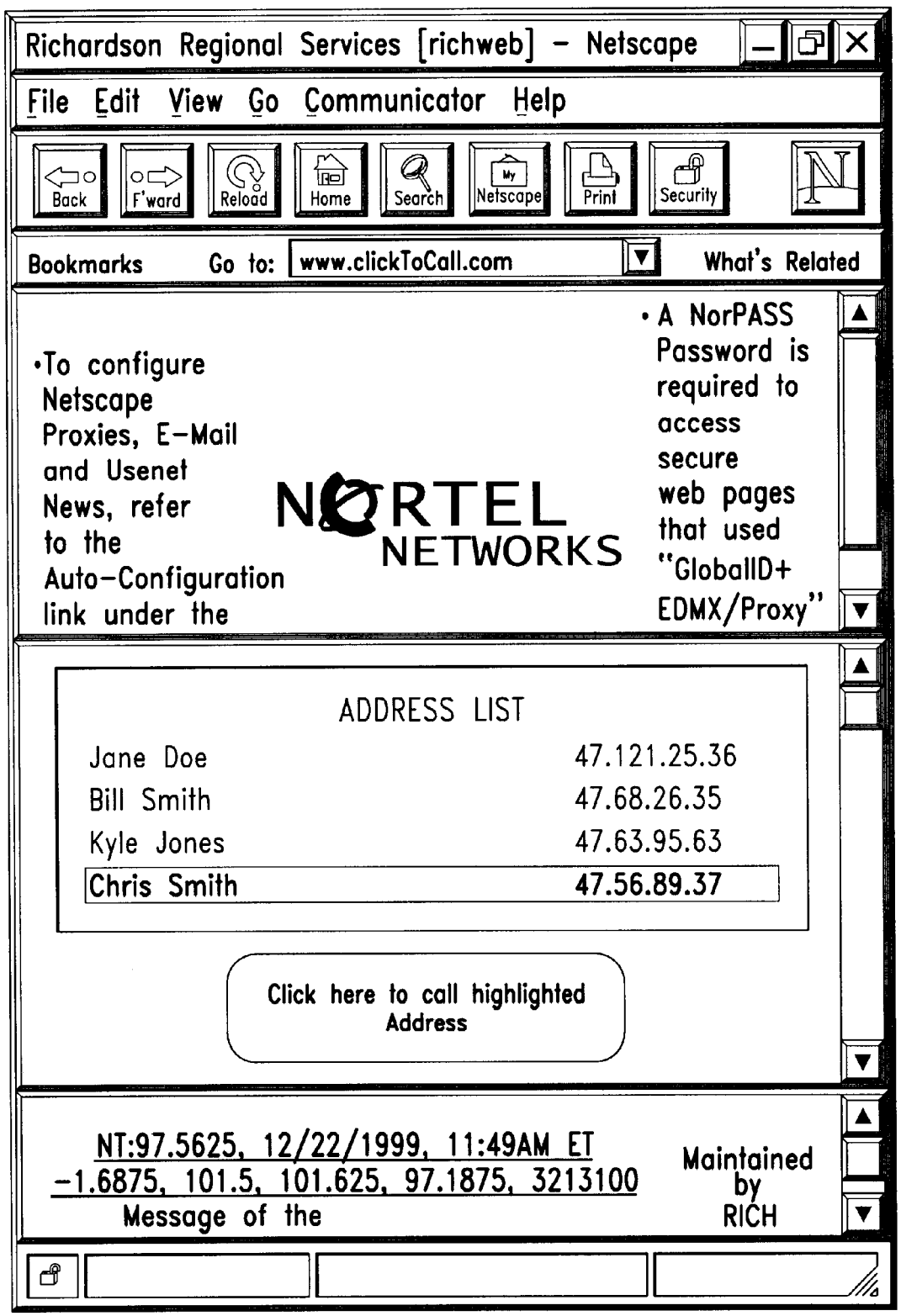
FIG. 7B is an exemplary diagram of a web browser used to perform a click to call function based on directory information from a directory server.

FIG. 7A is an exemplary diagram of a graphical user interface 700 provided by the click to call device 250 via the user interface 210 when using local directory information to initiate an IP telephony call. Alternatively, a similar graphical user interface may be obtained from the directory server 114 using a web browser, as shown in FIG. 7B. As shown in FIG. 7A, the graphical user interface provides a listing of available parties 710 with which an IP telephony call may be initiated. The user may highlight a desired party from the list using, for example, a keyboard or pointing device, and may then select the "call" icon 720 to initiate an IP telephony call to the desired party.

Once an IP call to the desired party has been initiated, or when a desired party has been selected, a display of the desired party's directory listing may be provided via the user interface 210. For example, a display similar to that shown in FIG. 4 may be provided to the user for his/her information.

When an IP call is initiated using directory listing information directly from the directory server 114, as shown in FIG. 7B, an applet may be initiated for downloading the selected directory listing to the intelligent IP telephony device 200 such that the intelligent IP telephony device 200 may initiate the IP telephony call to the desired party. As shown in FIG. 7B, this may be performed by selecting the appropriate directory listing and virtually pressing the virtual button "click here to call highlighted address."

As an example of the click to call functionality, the name "Chris Jessen" is highlighted in the example shown in FIG. 7. If the user then selects the "call" icon 720, an IP telephony call will be initiated with an IP telephony device associated with Chris Jessen. The IP telephony call may be initiated using, for example, the Session Initiation Protocol (SIP) address for Chris Jessen, which is stored in the directory listing (see FIGS. 4 and 5). In addition, the directory listing for Chris Jessen (FIG. 4) may be displayed to the user for his/her information. The use of SIP addresses to initiate a SIP communications over an IP network is described, for example, in RFC 2543 available at ftp://ftp.isi.edu/in-notes/rfc2543.txt, which is hereby incorporated by reference.

In addition to initiating an IP telephony call, the graphical user interface 700 also provides the ability to adjust the volume 730 of the intelligent IP telephony device 200, display a more complete directory 740, initiate call screening functions 750 as will be discussed further below, delete a directory listing 760, and obtain on-line help 770 for operating the intelligent IP telephony device 200.

The above description of the invention is directed to the updating of local directory listings and the initiation of IP telephony calls using these directory listings. In addition to initiating IP telephony calls, the present invention provides a mechanism by which intelligent processing of incoming calls may be performed. In particular, the incoming call processor 240 is used to perform intelligent processing of incoming calls based on screening information established by a user.

Figure 8:
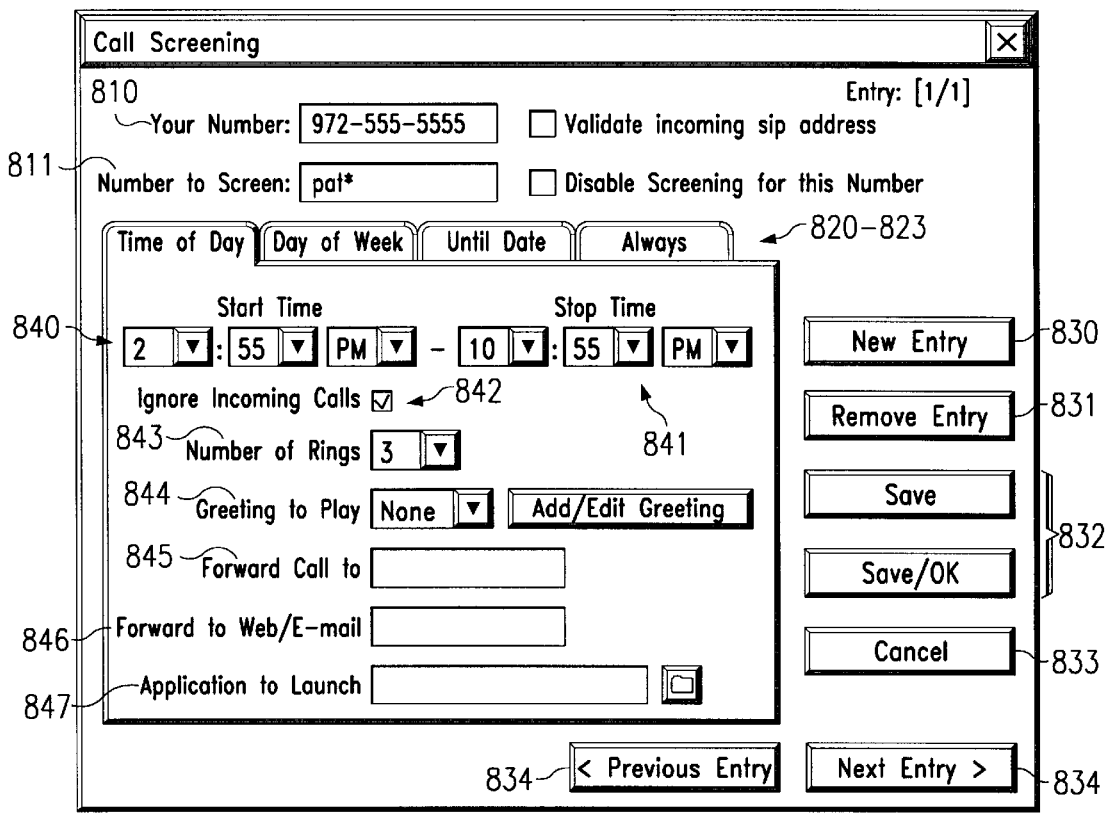
FIG. 8 is an exemplary diagram of a graphical user interface for entering a screen entry.

FIGS. 8–11 show an exemplary graphical user interface that may be provided by incoming call processor 240 to a user via the user interface 210 so that the user may establish screening information for use by the incoming call processor 240. As shown in FIG. 8, the graphical user interface 800 includes a field 810 for identifying the receiving party's address, a field 811 for identifying the sending party's identifier(s) that is to be used for screen calls from the sending party, and tabbed screening options 820–823 corresponding to "Time of Day," "Day of Week," "Until Date," and "Always." Each of the tabbed screening options 820–823 has its own fields for entering screening information for use by the incoming call processor 240, as will be described more fully below. In addition, the graphical user interface 800 includes virtual buttons for creating a new entry 830, removing an entry 831, saving an entry 832, canceling an action 833, and scrolling between entries 834.

FIG. 8 shows screening information for screening calls from any caller having an identification "pat*" during a particular time of day. The "*" is a wildcard character that designates any string of alpha-numeric characters. Thus, any identification whose first three characters are "pat" will be included in the character string "pat*." It should be noted that the screening information may be set such that all calls from all calling parties may be screened by entering only wildcard characters in the "number to screen" field.

As shown in FIG. 8, from a start time of 2:55 PM to an end time of 10:55 PM (fields 840 and 841), calls from "pat*" will be ignored because the "ignore incoming calls" field 842 has been selected. Although not selected in the particular example shown in FIG. 8, the user also has the option of selecting the number of rings 843 before the incoming call processor 240 performs call screening functions, the greeting to be played to the calling party 844, an address to forward the call to 845, a web page or electronic mail address to direct the calling party to 846, or an application that is to be executed 847.

The greeting to be played may be, for example, a pre-recorded message that the user wishes a calling party to hear when the calling party calls the user's intelligent IP telephony device 200. This pre-recorded message may be stored, for example, as a WAV file in the user's intelligent IP telephony device 200.

The user may also enter an address to which to forward calls from the calling party "pat*." Thus, if a user knows he/she will not be able to be present at the user's intelligent IP telephony device 200 at a particular time of day, the user may designate another address at which he will be able to receive incoming IP telephony calls. When a call from a particular calling party is received, the call will be forwarded to the designated address using call forwarding in a manner generally known to those of ordinary skill in the art. The address may take the form of, for example, a SIP address or IP address.

The user may also enter a web page address to which the calling party will be directed when a call is received from that particular calling party. When the calling party calls the user's intelligent IP telephony device 200, the user's intelligent IP telephony device 200 will instruct the calling party's IP telephony device to initiate a web browser application and enter the web page address in the appropriate field of the web browser application such that the calling party is presented with the desired web page.

Additionally, the user may enter an electronic mail address to which he/she wishes the calling party to send an electronic mail note. When a call is received from the calling party, the user's intelligent IP telephony device 200 will instruct the calling party's IP telephony device to initiate an electronic mail application and will insert the electronic mail address in the appropriate "To" field of the electronic mail application.

In addition to the above, the user may designate particular applications that he/she wishes to be executed when a call is received from a particular calling party. These applications may be applications that are to be executed on the user's computing device 108, for example, and/or applications that are to be executed on the calling party's computing device. Thus, for example, if a user has a telephone conference scheduled with a calling party for a particular time of day, he/she may set up the screening information such that an Excel spreadsheet is opened when a call from the calling party is received.

With electronic mail and web browser programs, the computing devices on which the intelligent IP telephony devices are resident or the intelligent IP telephony devices themselves may be configured so that when a command signal is received from another intelligent IP telephony device, the electronic mail and web browser programs are automatically executed. With other applications, the intelligent IP telephony device that sends the command to execute the application must have information pertaining to the application, such as the path and executable program name, for executing the application and forward this information with the command to execute the application.

Figure 9:
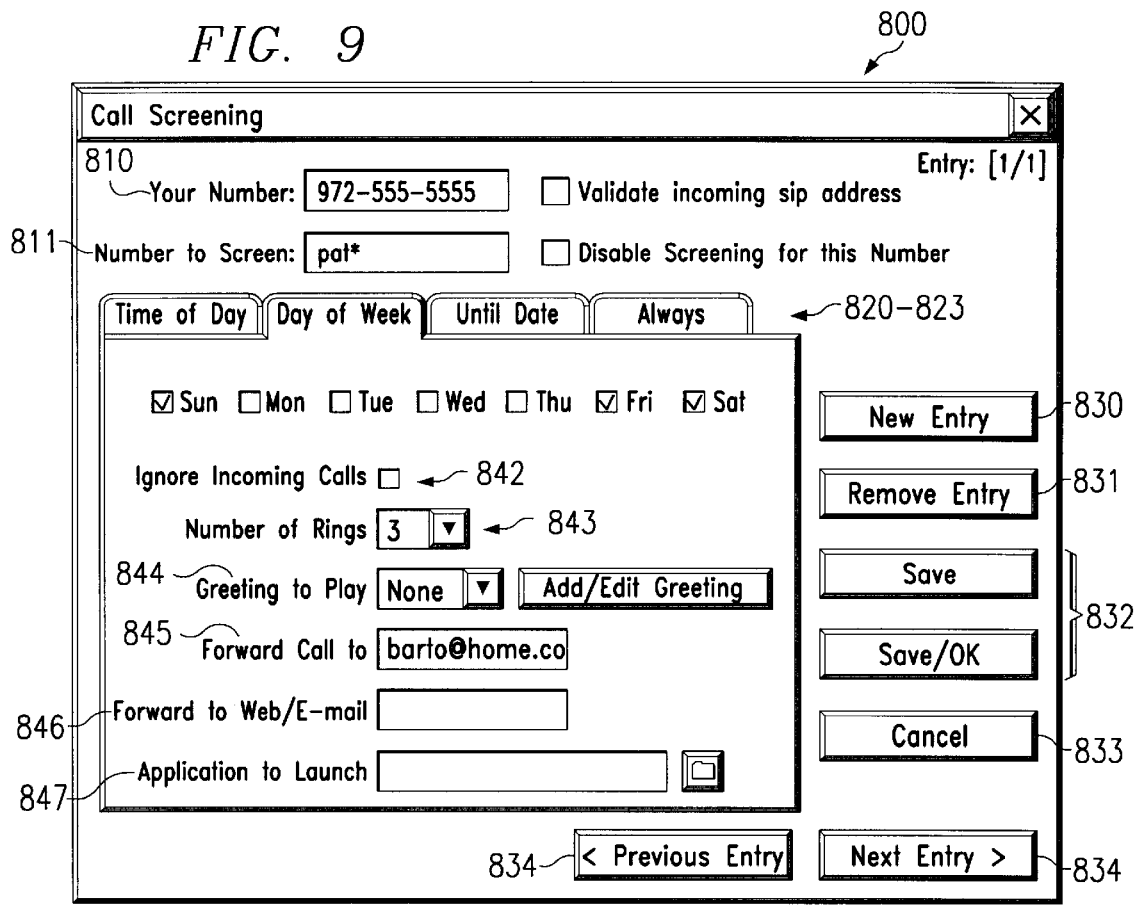
FIG. 9 is an exemplary diagram of a graphical user interface illustrating the screen option "Day of Week"

FIG. 9 shows the same graphical user interface 800 with the "Day of Week" tabbed screening option 821 shown. The main difference between the "Day of Week" and "Time of Day" screening options 820, 821 is that the days of the week are shown as optional screening information in place of the time of day fields.

Figure 10:
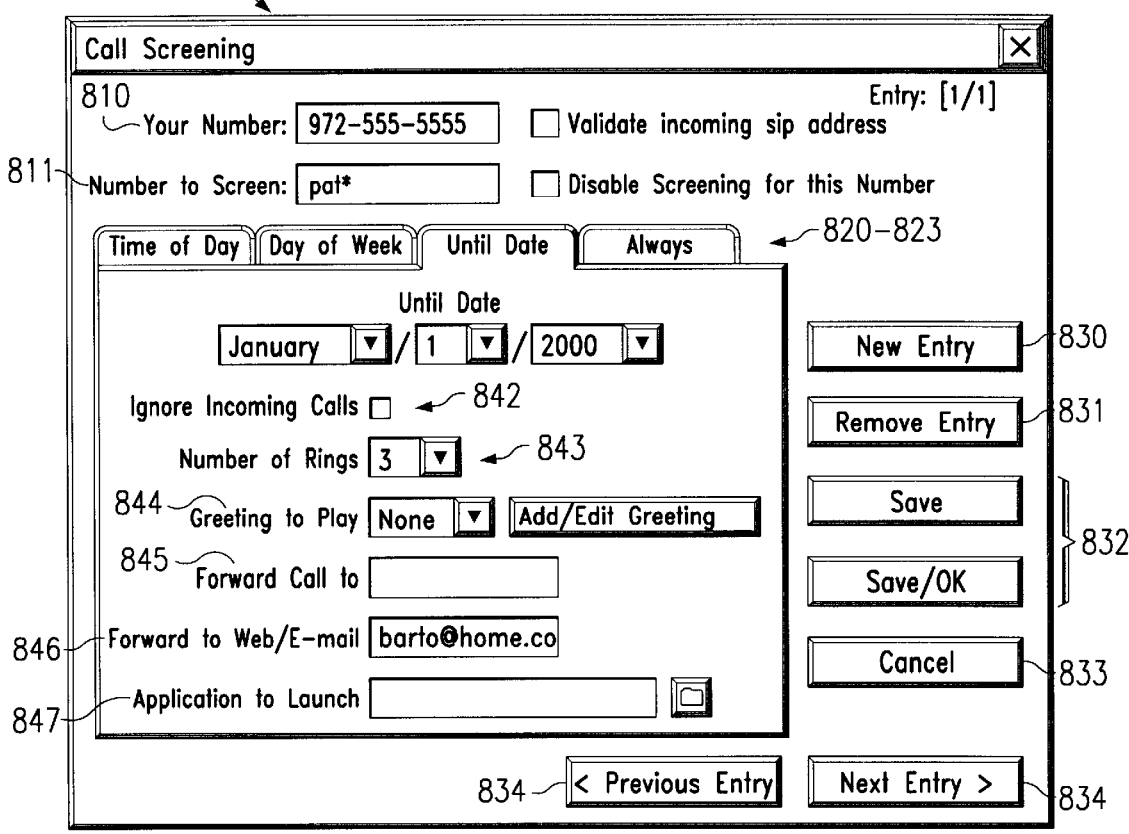
FIG. 10 is an exemplary diagram of a graphical user interface illustrating the screen option "Until Date"
Figure 11:
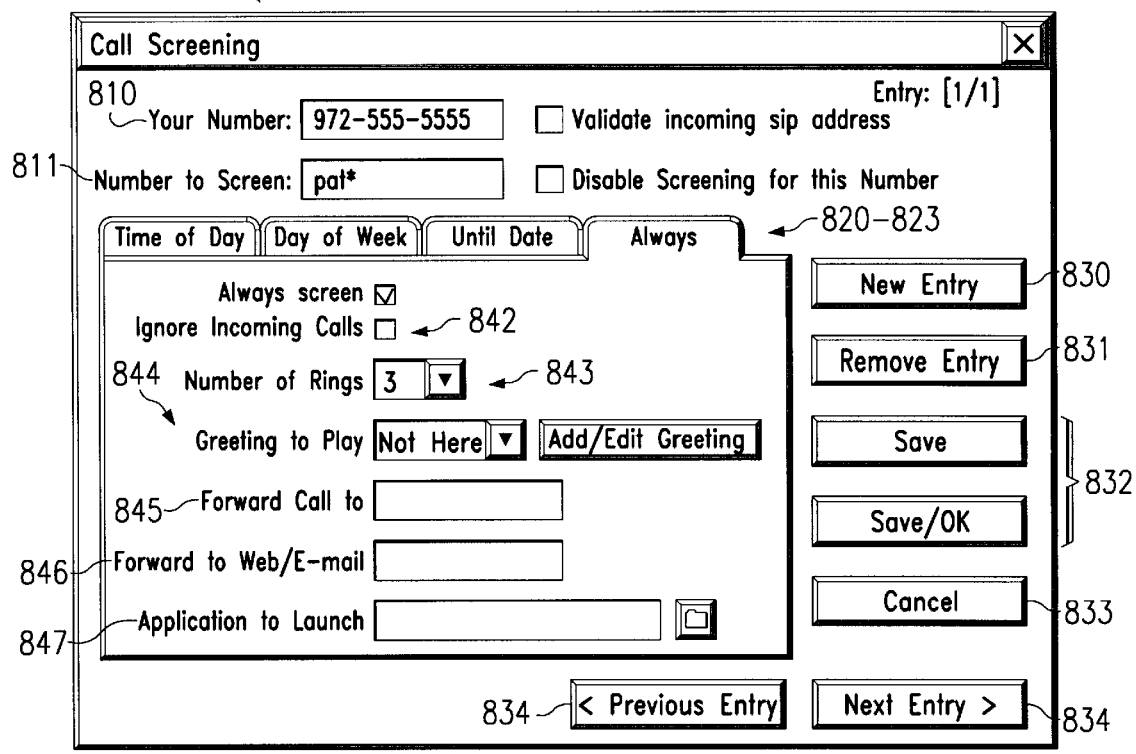
FIG. 11 is an exemplary diagram of a graphical user interface illustrating the screen option "Always"

FIG. 10 shows the same graphical user interface 800 with the "Until Date" tabbed screening option 822 shown. The main difference between the "Until Date" screening option 822 and the other options is that an "until date" is selectable rather than a time of day or day of the week. FIG. 11 shows the same graphical user interface 800 with the "Always" tabbed screening option 823 shown. The main difference between the "Always" screening option 823 and the other options is that there are no day of week, time of day, or until date fields provided. Rather, an "always screen" option is selectable.

The various tabbed options 820–823 may be performed exclusive of one another or may be performed in conjunction with one another. For example, each tabbed option 820–823 may be provided with a priority level. Thus, if there are two tabbed options selected, such as "Time of Day" and "Day of Week", the tabbed option "Day of Week" may be provided with a higher priority than "Time of Day" and thus, only the screening information associated with the "Day of Week" option will be used by the incoming call processor 240.

Alternatively, the tabbed options 820–823 may be performed in a hierarchical non-exclusive manner. Thus, if a user has "always" screen information active, this information will be used to screen calls from a particular calling party that do not fall into a particular time of day, day of week or date range. If the user has particular "until date" screening information active, this information will be used for all calls from a particular calling party falling within the date range that do not fall within a particular time of day or day of the week. Similarly, the "day of the week" screening information will be used to process incoming calls from a particular party that fall within the day of the week screening criteria and do not fall within a particular time of day. Lastly, the "time of day" screening information may be used with all calls from a particular party that fall within a particular time of day.

Moreover, the invention is not limited to performing a single call screening function. Rather, a plurality of screening functions may be performed when a call from a particular calling party is received. Thus, for example, when a call is received from a calling party "pat*," the calling party may be directed to a particular web page as well as have the call redirected to another address at which the user may be reached. Any number of the available call screening functions may be performed together without departing from the spirit and scope of the invention. Furthermore, a plurality of call forwarding addresses, applications to be executed, greetings, and the like may be designated to be used in succession.

Additionally, the invention may perform incoming call screening based on an identifier of the called party. Thus, for example, if there are many users of an intelligent IP telephony device 200, each user may have incoming call screening entries associated with them. When an incoming call is received, the intelligent IP telephony device 200 may identified the called party from an identifier in the incoming call and apply call screening functions identified by the call screening entries associated with the called party.

Thus, with the present invention, incoming IP telephony calls may be screened by the user's intelligent IP telephony device 200 in any of a number of customizable manners. The user may customize the intelligent processing of calls from a particular calling party, group of calling parties, or all calling parties such that the calls are ignored, played a greeting, forwarded to another address, directed to a particular web page or electronic mail address, and/or to have an particular application executed when the call is received.

Figure 14:
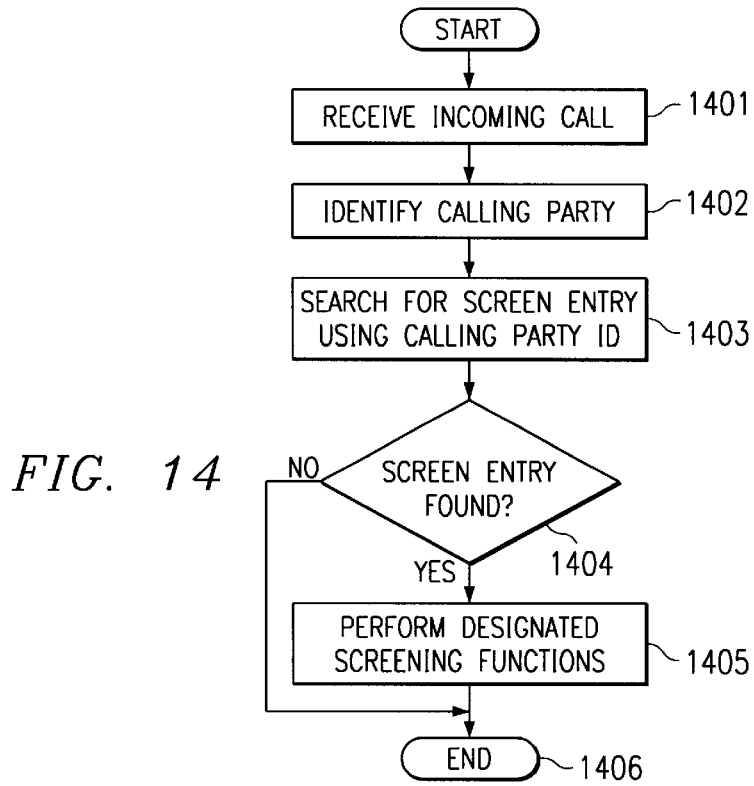
FIG. 14 is a flowchart outlining an exemplary operation of the incoming call processor of FIG. 3.
Figure 12:
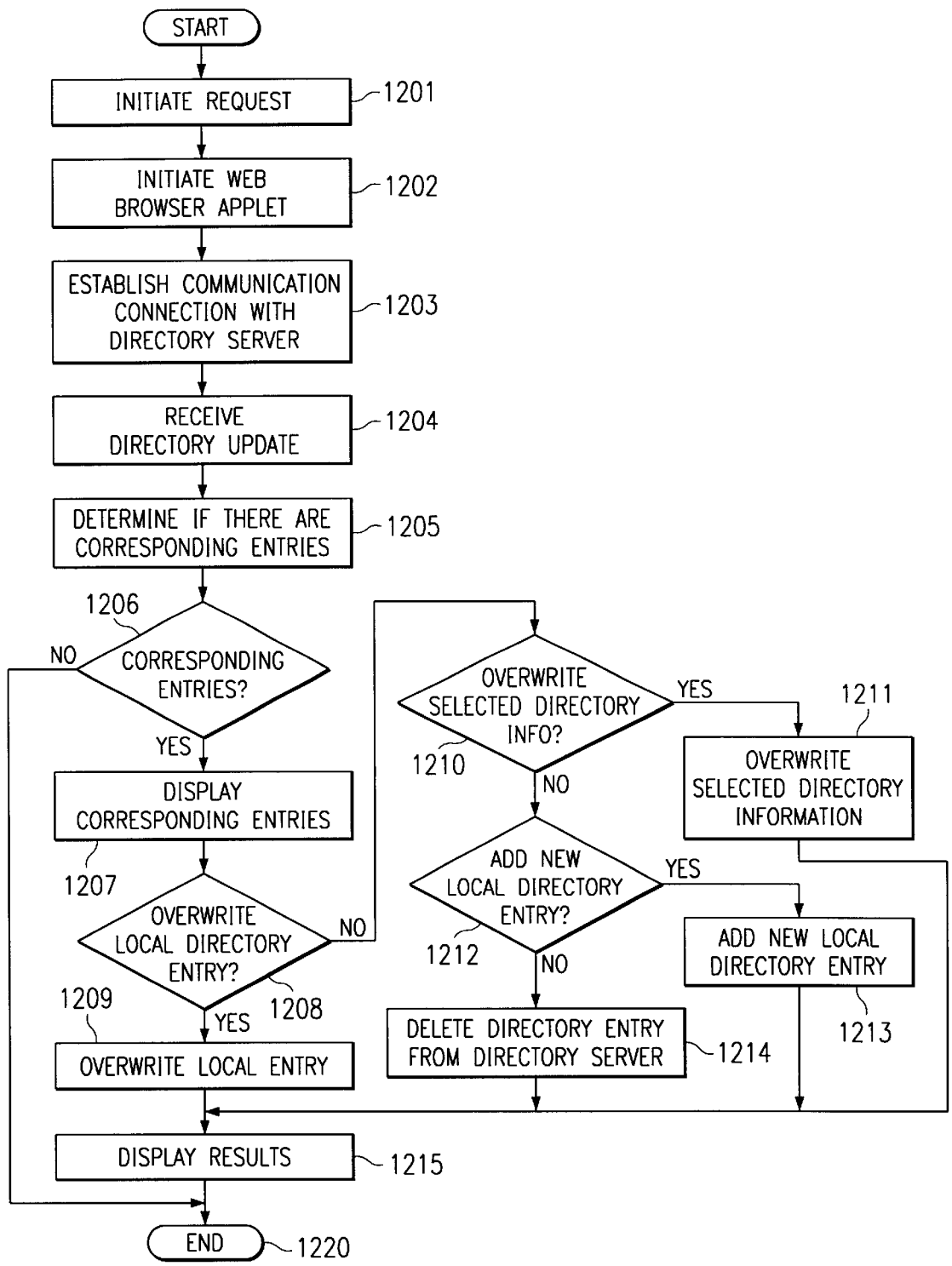
FIG. 12 is a flowchart outlining an exemplary operation of the directory update device of FIG. 3.

The various functions of the intelligent IP telephony device 200 will now be described in terms of flowcharts representing exemplary operations of the elements of the intelligent IP telephony device 200. The flowcharts shown in FIGS. 12–14 are only exemplary and are meant only as an outline of the operations. Details of the operations may be dependent on the particular implementation of the invention.

FIG. 12 is a flowchart outlining an exemplary operation of the directory update device 260. As shown in FIG. 12, the operation starts with a request for a directory update being initiated (step 1201). In response, the web browser applet for downloading the directory update is initiated (step 1202). A communication connection is established with the directory server 114 using, for example, HTTP (step 1203). The directory update device 260 then receives the directory update from the directory server 114 (step 1204).

Either during the download processor after the download is complete, the directory update device 260 determines if there are corresponding entries in the downloaded directory information and the local directory (step 1205). If there is no corresponding entries (step 1206:NO), the directory update process either continues in the case that the determination is performed during the download, or the directory update process is completed (step 1220), in the case that the determination is performed after the download process.

If there are corresponding entries (step 1206:YES), the directory update device 260 determines if the user wishes to overwrite the local directory entry (step 1208), overwrite selection directory information in the local directory entry (step 1210), or add a new local entry using the downloaded directory information (step 1212). If any of these options are selected by the user, the corresponding functions (steps 1209, 1211 and 1213) are performed. If none of these options are selected, the downloaded directory entry is deleted (step 1214). Once all of the directory entries are updated, the directory update device 260 displays update results to the user via the user interface 210 (step 1215).

FIG. 13 is a flowchart outlining an exemplary operation of the click to call device 250. As shown in FIG. 13, the operation starts with the click to call device receiving a user selection of a desired party directory listing (step 1301). In response, the click to call device 250 displays a detailed directory listing via the user interface 210 (step 1302). If the selection is from the directory server and not the local directory (step 1303:YES), the directory listing is downloaded to the intelligent IP telephony device 200. If not, the local directory listing is used (step 1303:NO). The click to call device 250 then initiates an IP telephony call using address information from the directory listing (step 1305). The operation then ends (step 1306).

FIG. 14 is a flowchart outlining an exemplary operation of the incoming call processor 240. As shown in FIG. 14, the operation starts with the incoming call processor 240 receiving an incoming call (step 1401). The incoming call processor 240 identifies the calling party (step 1402) and searches for a screen entry corresponding to the calling party (step 1403). If a screen entry is not found (step 1404:NO), the operation ends (step 1406). If a screen entry is found (step 1404:YES), appropriate screening functions are performed based on the screening information in a manner set forth above (step 1405). The operation then ends (step 1406).

Thus, with the present invention, intelligent IP telephony call processing is performed without having to rely on network servers to perform these functions. In addition, a local directory may be maintained and updated even if there are security precautions preventing direct access from the intelligent IP telephony device 200 to the directory server. Furthermore, a user may make use of either remotely located directory information or local directory information to initiate an IP telephony call by clicking on a directory listing.

It is important to note that while the present invention has been described in the context of a fully functioning data processing system, such as computing devices 106 and 108, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. For example, the present invention is not limited to a network distributed system as all of the application and SIP clients may be present within a single data processing system. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a communications system for updating, from a network directory server, a local telephony directory on a telephony device, comprising:

establishing a communication connection between the telephony device and the network directory server;

sending an update request to the network directory server through the communication connection;

receiving updated telephony directory information from the network directory server through the communication connection; and updating the local telephony directory based on the updated telephony directory information.

2. The method of claim 1, wherein establishing a communication connection between the telephony device and the network directory server includes initiating an applet to facilitate communication with the network directory server and with the telephony device.

3. The method of claim 2, wherein the applet communicates with the network directory server using hypertext transfer protocol and communicates with the telephony device directly.

4. The method of claim 1, wherein receiving updated telephony directory information from the network directory server includes identifying telephony directory information for transmitting to the telephony device based on at least one of an identification of a user that initiated the sending of the update request, parameters entered by the user, and a time since the last update of the local telephony directory.

5. The method of claim 1, further comprising identifying a first directory listing in the updated telephony directory information that corresponds to a second directory listing in the local telephony directory.

6. The method of claim 5, further comprising displaying the first directory listing and the second directory at a same time.

7. The method of claim 5, further comprising receiving a user selection of one of overwriting the second directory listing with the first directory listing, keeping the second directory listing, overwriting selected information in the second directory listing with information from the first directory listing, and adding a new directory listing in the local telephony directory corresponding to the first directory listing.

8. The method of claim 1, further comprising displaying results of updating the local telephony directory.

9. The method of claim 1, wherein the establishing, sending, and receiving steps are performed using a network browser application and an applet for downloading updated telephony directory information.

10. The method of claim 9, wherein the network browser application and the telephony device reside on the same computing device.

11. The method of claim 9, wherein the network browser application resides on a computing device and the telephony device is coupled to the computing device.

12. The method of claim 1, wherein the telephony device is an IP telephony device.

13. A computer program product in a computer-readable medium for use in a data processing system for updating, from a network directory server, a local telephony directory on a telephony device, comprising:

first instructions for establishing a communication connection between the telephony device and the network directory server;

second instructions for sending an update request to the network directory server through the communication connection;

third instructions for receiving updated telephony directory information from the network directory server through the communication connection; and fourth instructions for updating the local telephony directory based on the updated telephony directory information.

14. A telephony apparatus for communicating over a network, comprising:

a controller;

a network interface coupled to the controller; and a directory update device coupled to the controller, wherein the controller establishes a communication connection between the telephony apparatus and a network directory server via the network interface, the directory update device sends an update request to the network directory server, the directory update device receives updated telephony directory information from the network directory server, and wherein the directory update device updates a local telephony directory based on the updated telephony directory information.

15. The apparatus of claim 14, wherein the controller establishes a communication connection between the telephony device and the network directory server by initiating an applet to facilitate communication with the network directory server and with the telephony device.

16. The apparatus of claim 15, wherein the applet communicates with the network directory server using hypertext transfer protocol.

17. The apparatus of claim 14, wherein the directory update device identifies a first directory listing in the updated telephony directory information that corresponds to a second directory listing in the local telephony directory.

18. A method in a communications system for updating, from a network directory server, a local telephony directory on a telephony device, comprising:

establishing a communication connection between the telephony device and the network directory server;

receiving an update request from the telephony device through the communication connection;

sending updated telephony directory information from the network directory server through the communication connection, the updated telephony directory information being used by the telephony device to update the local telephony directory.

19. The method of claim 18, further comprising sending instructions to the telephony device to display results of updating the local telephony directory.

20. A telephony apparatus that initiates a telephony call, over a network having a network directory server, to a receiving telephony device, comprising:

a network interface;

a controller coupled to the network interface; and a user interface coupled to the controller, wherein the controller receives directory information, from a directory on the network directory server, via the network interface, and receives, via the user interface, a user selection of a directory listing from the directory information, and wherein the controller initiates a telephony call from the telephony apparatus to the receiving telephony device based on the user selection.

21. The apparatus of claim 20, further comprising a display that displays the directory information.

22. The apparatus of claim 20, wherein the controller downloads, from the network directory server to the telephony apparatus, directory listing information for the receiving telephony device in response to receiving the user selection, and wherein the telephony call is initiated from the telephony apparatus based on the downloaded directory listing information.

23. The apparatus of claim 20, wherein the user interface includes a graphical user interface.

* * * * *